US010869236B2

(12) United States Patent
Kim

(10) Patent No.: US 10,869,236 B2
(45) Date of Patent: Dec. 15, 2020

(54) METHOD FOR CONTROLLING MOBILITY OF TERMINAL IN HETEROGENEOUS NETWORK AND APPARATUS THEREFOR

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/347,572

(22) PCT Filed: Mar. 23, 2018

(86) PCT No.: PCT/KR2018/003466
§ 371 (c)(1),
(2) Date: May 3, 2019

(87) PCT Pub. No.: WO2018/174654
PCT Pub. Date: Sep. 27, 2018

(65) Prior Publication Data
US 2019/0349821 A1    Nov. 14, 2019

(30) Foreign Application Priority Data

Mar. 24, 2017  (KR) .................... 10-2017-0037934
Mar. 22, 2018  (KR) .................... 10-2018-0033250

(51) Int. Cl.
*H04W 36/00* (2009.01)
*H04L 5/00* (2006.01)

(52) U.S. Cl.
CPC ....... *H04W 36/0069* (2018.08); *H04L 5/0032* (2013.01); *H04L 5/0055* (2013.01); *H04W 36/0072* (2013.01); *H04W 36/00835* (2018.08)

(58) Field of Classification Search
None
See application file for complete search history.

(56) References Cited

U.S. PATENT DOCUMENTS

2009/0170426 A1*  7/2009  Jung ................. H04W 8/24
                                                           455/7
2014/0080484 A1*  3/2014  Centonza .......... H04W 36/0055
                                                           455/436

(Continued)

FOREIGN PATENT DOCUMENTS

EP           2894903 A1    7/2015
KR    10-2015-0096499 A    8/2015

OTHER PUBLICATIONS

ZTE, "Discussion on control plane for the DC based LTE/NR tight interworking", R2-163741, 3GPP TSG RAN WG2 Meeting #94, Nanjing, China, May 23-27, 2016, pp. 1-4.

*Primary Examiner* — Brian S Roberts
(74) *Attorney, Agent, or Firm* — IP Legal Services, LLC

(57) ABSTRACT

Provided are a method and an apparatus for performing a mobility control procedure of a terminal, by a master base station. The method includes: determining starting of a secondary node addition procedure for setting a terminal context for a secondary node in order to provide the terminal with a radio resource of the secondary node; transmitting, to the secondary node, a secondary base station addition request message for requesting radio resource allocation for a specific E-UTRAN radio access bearer (E-RAB); and receiving, from the secondary node, secondary cell group radio resource configuration information to be additionally configured in the terminal.

12 Claims, 11 Drawing Sheets

(56) References Cited

U.S. PATENT DOCUMENTS

| | | | |
|---|---|---|---|
| 2014/0335869 A1* | 11/2014 | Choi | H04W 40/36 |
| | | | 455/438 |
| 2014/0355562 A1* | 12/2014 | Gao | H04W 72/0426 |
| | | | 370/331 |
| 2015/0173120 A1* | 6/2015 | Yamada | H04W 76/11 |
| | | | 370/331 |
| 2015/0215826 A1 | 7/2015 | Yamada | |
| 2015/0215965 A1* | 7/2015 | Yamada | H04W 36/0069 |
| | | | 370/329 |
| 2015/0358866 A1 | 12/2015 | Xu et al. | |
| 2016/0044744 A1 | 2/2016 | Lee et al. | |
| 2016/0345204 A1 | 11/2016 | Godin et al. | |
| 2017/0078940 A1 | 3/2017 | Zhang et al. | |
| 2017/0311212 A1 | 10/2017 | Yamada | |
| 2018/0035485 A1 | 2/2018 | Lee et al. | |
| 2018/0206158 A1 | 7/2018 | Yamada | |
| 2018/0242209 A1 | 8/2018 | Xu et al. | |
| 2018/0343594 A1 | 11/2018 | Yamada | |

* cited by examiner

METHOD FOR CONTROLLING MOBILITY OF TERMINAL IN HETEROGENEOUS NETWORK AND APPARATUS THEREFOR

CROSS REFERENCE TO RELATED APPLICATIONS

This application is a National Stage Patent Application of PCT International Patent Application No. PCT/KR2018/003466 (filed on Mar. 23, 2018) under 35 U.S.C. § 371, which claims priority to Korean Patent Application Nos. 10-2017-0037934 (filed on Mar. 24, 2017), and 10-2018-0033250 (filed on Mar. 22, 2018), the teachings of which are incorporated herein in their entireties by reference.

TECHNICAL FIELD

The present disclosure relates to a method and a system for mobility control based on dual connectivity through an interface between a fifth generation (5G) base station and an long term evolution (LTE) base station in a 5G non-standalone (NSA) network structure using an LTE evolved packet core (EPC) as a core network.

BACKGROUND ART

The typical long term evolution (LTE) supports bearer management for interworking between an LTE base station and an evolved packet core (EPC), which is a core network, through an S1 interface and application protocols.

Meanwhile, with a 5G network introduced newly, it is necessary to provide mobility. Especially, in case a 5G base station uses an mmWave frequency in a high-frequency band (e.g., 28 GHz), the coverage of the base station is expected to become smaller due to the characteristics of the frequency. The using of the high-frequency band of the 5G base station results in a user equipment moving more frequently between base stations. Therefore, it is very important to provide a handover procedure or a dual connectivity procedure for addressing such an issue.

In addition, the 5G network enters its initial introduction stage, and there is a strong possibility of utilizing a 5G non-standalone (NSA) network structure using an LTE EPC as a core network. As results, there are increasing needs for a procedure and a system for mobility control based on dual connectivity through an interface between a 5G base station and an LTE base station.

In such a situation, in a 5G NSA network structure using a typical LTE EPC as a core network, dual connectivity may be used for supporting interface-based mobility between a 5G base station (hereinafter, may be referred to as "5G NB", "NR NB", "NG-RAN", "NR base station" or "gNB") and an LTE base station (hereinafter, may be referred to as "LTE NB", "eNB" or "typical base station"). To this end, it is required to upgrade and modify a procedure, a message and an information element in a typical X2 application protocol (X2AP).

That is, in the NSA deployment for enabling the LTE base station and the 5G base station to use an LTE EPC as a core network, it is necessary to develop a procedure and a method for configuring dual connectivity for a user equipment.

DETAILED DESCRIPTION OF THE INVENTION

Technical Problem

In accordance with embodiments of the present disclosure to address such issues, a method is provided for configuring dual connectivity for a user equipment using an LTE base station and a 5G base station in a 5G NSA network.

In addition, in accordance with embodiments of the present disclosure, a method is provided for adding a 5G base station as a secondary base station to a user equipment performing communications with an LTE base station.

Technical Solution

In accordance with an aspect of the present disclosure to address such issues, a method of a master base station is provided for performing a procedure of controlling the mobility of a user equipment. The method includes: determining to initiate a secondary node addition procedure for establishing a user equipment context at a secondary node to provide radio resources from the secondary node to the user equipment, transmitting, to the secondary node, a secondary base station addition request message for requesting to allocate the radio resources for a specific E-UTRAN radio access bearer (E-RAB), and receiving, from the secondary node, secondary cell group radio resource configuration information for additionally providing secondary cell group radio resources to the user equipment.

In accordance with another aspect of the present disclosure, a method of a secondary base station is provided for performing a procedure of controlling the mobility of a user equipment. The method includes: receiving, from a master node, a secondary base station addition request message for requesting to allocate radio resources for a specific E-UTRAN radio access bearer (E-RAB) of the user equipment, acknowledging radio resource allocation for the specific E-RAB by a RRM entity and allocating transmission network resources depending on an E-RAB option, and transmitting, to the master node, a secondary cell group radio resource configuration information for additionally providing secondary cell group radio resources to the user equipment.

In accordance with still another aspect of the present disclosure, a master base station is provided for performing a procedure of controlling the mobility of a user equipment. The master base station includes: a controller determining to initiate a secondary node addition procedure for establishing a user equipment context at a secondary node to provide radio resources from the secondary node to the user equipment, a transmitter transmitting, to the secondary node, a secondary base station addition request message for requesting to allocate the radio resources for a specific E-UTRAN radio access bearer (E-RAB), and a receiver receiving, from the secondary node, secondary cell group radio resource configuration information for additionally providing secondary cell group radio resources to the user equipment.

In accordance with yet another aspect of the present disclosure, a secondary base station is provided for performing a procedure of controlling the mobility of a user equipment. The secondary base station includes: a receiver receiving, from a master node, a secondary base station addition request message for requesting to allocate radio resources for a specific E-UTRAN radio access bearer (E-RAB) of the user equipment, a controller acknowledging radio resource allocation for the specific E-RAB by a RRM entity and allocating transmission network resources depending on an E-RAB option, and a transmitter transmitting, to the master node, a secondary cell group radio resource configuration information for additionally providing secondary cell group radio resources to the user equipment.

Effects of the Invention

In accordance with embodiments of the present disclosure, a user equipment is able to configure dual connectivity through an LTE base station and a 5G base station and to provide communication data transmission/reception services by utilizing a plurality of radio resources in an NSA network.

In addition, in accordance with embodiments of the present disclosure, a user equipment is able to configure dual connectivity by utilizing an LTE EPC even when a core network of a 5G base station is not deployed yet.

BEST MODE FOR CARRYING OUT THE INVENTION

Figure 1:
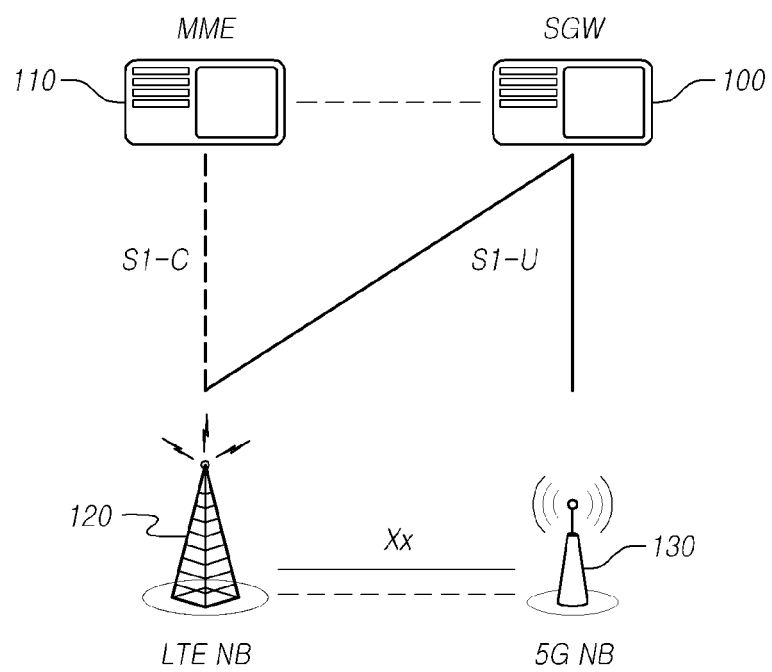
FIG. 1 is a view illustrating a structure of a 5G NAS network including a 5G base station linked to an LTE EPC and an LTE base station according to some embodiments of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a machine type communication (MTC) terminal may refer to a terminal supporting low cost (or low complexity), a terminal supporting coverage enhancement, or the like. The MTC terminal may refer to a terminal supporting low cost (or low complexity), a terminal supporting coverage enhancement, and the like. The MTC terminal may refer to a terminal classified into a predetermined category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13.

In the present disclosure, a wireless communication system is widely deployed to provide various communication services, such as a voice communication service, a packet data service, etc. The wireless communication system includes a user equipment (Hereinafter, referred to as "UE") and a base station (BS, or eNB). In the present disclosure, the UE is defined as a generic term referring to terminals used in wireless communications. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, the base station or the cell is defined as a generic term including, but not limited to, as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms a corresponding communication service area, such as a megacell, a macrocell, a microcell, a picocell, a femtocell, or a small cell, and provides a communication service within the corresponding communication service area or 2) a communication service area. In the case of 1), the base station may be referred to i) apparatuses that are controlled by the same entity for forming a corresponding communication service area and providing a communication serviced within the corresponding communication service area or ii) apparatuses that interact and cooperate with each other for forming the corresponding communication service area and providing the communication service within the corresponding communication service area. According to communication schemes employed by a base station, the base station may be referred to as an eNB, a RRH, an antenna, a RU, a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. An embodiment of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, under the related standard, in some systems such as the LTE system or the LTE-advanced system, the UL and the DL are configured based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a base station or macrocell (hereinafter, referred to as 'eNB') and at least one remote radio head (RRH) that is connected to the eNB through an optical cable or an optical fiber and thereby controlled in a wired manner, and that has high transmission power or low transmission power in the macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission/reception of a signal through a channel such as the PUCCH, the PUSCH, the PDCCH, or the PDSCH, may be described as transmission/reception of the channel, such as the PUCCH, the PUSCH, the PDCCH, or the PDSCH.

In addition, hereinafter, a description of transmitting or receiving a PDCCH or a description of transmitting or receiving a signal through the PDCCH may be used as meaning including transmitting or receiving an EPDCCH or transmitting or receiving a signal through the EPDCCH.

That is, a physical DL control channel described below may mean the PDCCH or the EPDCCH, or is also used as meaning including both the PDCCH and the EPDCCH.

Also, for convenience of description and ease of understanding, an EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below includes radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

For example, in the present disclosure, the LTE and the NR denote different radio access technologies, and the term "NR" as used herein refers to a new radio access technology under discussion in Release-15 of the 3GPP. The NR may include various differences compared with the LTE, such as a different frame structure, channel, core network technology, or the like, and may additionally include wireless transmission in a high band, transmission of a large volume of data or transmission of data in high speed.

Hereinafter, for convenience of description and ease of understanding, typical radio access technologies are referred to as the LTE, and the new radio access technology under discussion in the 3GPP is referred to as the NR. A base station may be an eNB employing the LTE technology or a gNB employing the NR technology, and one of the eNB and the gNB will be used, if necessary.

A cell is used as a generic term including, but not limited to, a radio path, a radio link, a carrier, or the like, for transmitting data, and one base station may transmit/receive data using a plurality of cells. A UE may transmit/receive data using a plurality of cells through each cell controlled by each of two base stations. As described below, the using of a plurality of cells controlled by one base station is described as carrier aggregation, and the using of a plurality of cells controlled by two or more base stations is described as dual connectivity.

Dual Connectivity Operation

The typical LTE technology supports dual connectivity for a UE to simultaneously use radio resources of two base stations. A dual connectivity operation enables a multiple RX RX/TX UE in an RRC connected state to use radio resources which are connected to two base stations connected through non-ideal backhaul and which are provided by two different schedulers located in each base station.

In case of the dual connectivity, a user equipment may transmit/receive data through a plurality of cells provided by two or more base stations. In the present disclosure, a main base station establishing an RRC connection with the user equipment and acting as a reference of a handover is referred to as a master base station (MeNB) or a master node, and a base station supporting an additional cell to the user equipment is referred to as a secondary base station (SeNB) or a secondary node.

Meanwhile, as architecture for a next generation radio access technology and requirements for migration, it is necessary for RAN architecture to support tight interworking between the NR and the LTE. LTE dual connectivity is expected to be utilized for the tight interworking between the NR and the LTE. Dual connectivity using an LTE base station and an NR base station and dual connectivity using a plurality of NR base stations may be used for the tight interworking between the NR and the LTE. Dual connectivity in the NR environment may be defined as multi-connectivity. For example, the multi-connectivity may be defined as an operation mode of a UE for using radio resources configured by an LTE base station and/or an NR base station.

Embodiments of the present disclosure will be described based on the dual connectivity. However, the embodiments are not limited thereto. It should be noted that the dual connectivity and the associated description are provided in the way of example as one of possible schemes of allowing a plurality of base stations to provide radio resources to a UE. Therefore, the embodiments of the present disclosure are equally applicable to the multi-connectivity, and such an implementation to the multi-connectivity should be considered within the scope of the present disclosure. In addition, the NR in the present disclosure denotes a next generation radio access technology applying technical specifications after 3GPP Rel-15. The NR is used as a term for denoting a radio access technology that satisfies requirements of the IMT-2020.

Meanwhile, in the present disclosure, different terms may be used as follows, when necessary, to distinguish an LTE technology and an NR technology, A base station employing an LTE radio network is referred to as an LTE base station, a 4G base station, a typical base station, an eNB, an E-UTRAN NodeB, an LTE NB, or the like, and a base station employing an NR radio network employing a next generation radio access technology that is newly defined is referred to as an NR base station, a 5G base station, a gNB, a 5G NB, or the like. Further, a core network in the LTE network denotes an evolved packet core (EPC), and a core network in the NR network denotes a 5G core network (5GC). In addition to these terms, others are defined elsewhere in the specification, as necessary.

In terms of a function of dual connectivity, a base station establishing an RRC connection with a UE and acting as a reference of a handover is referred to as a master base station or a master node MN, and a base station supporting additional radio resources cell to the UE is referred to as a secondary base station or a secondary node SN. Further, a cell group provided by the master base station is referred to as a master cell group MCG, and a cell group provided by the secondary base station is referred to as a secondary cell group SCG. A cell supporting the transmission of an UL signal among a plurality of secondary cells included in a secondary cell group is referred to as a primary secondary cell PSCell.

The terms defined above are merely examples of possible definitions for convenience of description and ease of understanding. Embodiments of the present disclosure are not limited thereto.

The typical LTE radio network may provide mobility support between LTE base stations linked to an EPC which is a core network system through a S1 interface, an X2 interface and application protocols. As a 5G network is introduced newly, it is essential to provide connectivity with the typical LTE base station and mobility. In particular, in case a 5G base station uses an mmWave frequency in a high-frequency band (e.g., 28 GHz), smaller coverage is expected due to the characteristics of the frequency, and therefore there is a possibility of more frequent movement between the LTE base station and the 5G base station. Accordingly, it is important to provide a procedure for supporting the mobility to a UE for supporting frequent movement. In addition, in the early stage of the deployment of the 5G network, 5G base stations may be locally deployed, and therefore their reliance on LTE networks may be even greater.

In a 5G NSA network deployment for using the typical LTE EPC as a core network, for supporting interface-based mobility between the 5G base station and the LTE base station, it may be required to upgrade and modify a related procedure, a message and an information element in the typical X2 application protocol X2AP for using dual connectivity. Accordingly, in accordance with embodiments of the present disclosure, to support seamless mobility when a UE moves between a 5G base station and an LTE base station, procedures or methods are provided for controlling dual connectivity based mobility based on a direct interface and an application protocol between the 5G base station and the LTE base station.

Hereinafter, an exemplary network structure including an LTE base station and a 5G base station will be discussed in detail with reference to the accompanying drawings. In particular, in the present disclosure, embodiments are described based on a network structure for enabling the 5G base station to configure a UE with dual connectivity, by being linked to the LTE base station. However, embodiments of the present disclosure are not limited thereto. The embodiments of the present disclosure may be applicable to dual connectivity between 5G base stations as well.

Figure 2:
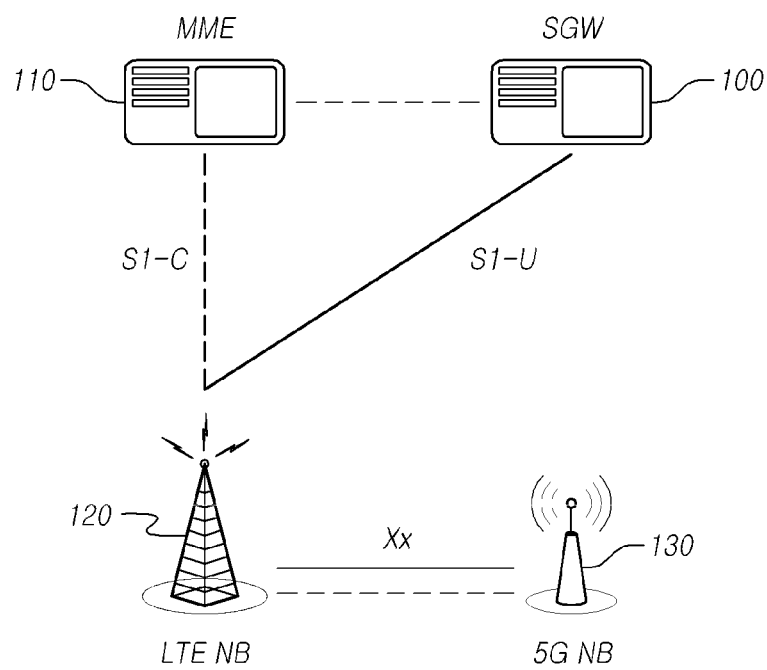
FIG. 2 is a view illustrating a structure of a 5G NAS network including a 5G base station linked to an LTE EPC and an LTE base station according to another embodiment of the present disclosure.

FIG. 1 is a view illustrating a 5G NAS network structure including a 5G base station linked to an LTE EPC and an LTE base station according to an embodiment of the present disclosure. FIG. 2 is a view illustrating a 5G NAS network structure including a 5G base station linked to an LTE EPC and an LTE base station according to another embodiment of the present disclosure Referring to FIGS. 1 and 2, a 5G network includes i) a standalone (SA) structure for enabling the 5G base station to operate by being connected to a 5G core network and ii) a non-standalone (NSA) for enabling the 5G base station to operate by being connected to an LTE EPC core network.

For example, the 5G NSA network includes an LTE EPC core network CN, an LTE radio access network LTE RAN 120 acting as a master base station, and a 5G radio access network 5G RAN 130 which is a secondary base station. The EPC is connected to an external data network DN via a PDN gateway PGW.

A UE is equipped with both 5G/LTE radio transmission/reception units and radio protocols, and connected to 5G/LTE radio interfaces LTE-Uu/5G-Uu. The UE may be accessible to the LTE base station and the 5G base station using dual connectivity.

Due to characteristics of the NSA network structure, an MME 110 which is responsible for mobility support, etc. and a serving gateway SGW 100 which is responsible for data processing are linked to the LTE base station 120 through a S1-C (or S1-MME) interface and a S1-U interface, respectively. In particular, MME 110 is responsible for mobility control such as a handover. Further, the 5G base station 130 may be linked to the SGW 100 through the S1-U interface. That is, the S1-C interface is not configured for the connection between the MME 110 and the 5G base station 130, and only the S1-U interface may be configured for the connection between the 5G base station 130 and the SGW 100.

For another scenario, as shown in FIG. 2, the 5G base station 130 may not be linked to the SGW 100 through the S1-U interface. That is, the 5G base station 130 may be connected to the LTE base station 120 and associated with each entity (MME or SGW) of the LTE EPC through the LTE base station 120.

In the present disclosure, the structure as illustrated in FIG. 1 is described as an NSA1, and the structure as illustrated in FIG. 2 is described as an NSA2.

Further, the interface and the application protocol between the 5G base station 130 and the LTE base station 120 are defined as an Xx and an XxAP, respectively.

Meanwhile, as described above, an interface between the EPC and the 5G base station may be configured with the S1 interface, and an interface between the EPC and the LTE base station may be also configured with the S1 interface. For example, a plurality of 5G base stations and LTE base stations may be connected to one EPC individually. It is noted that the 5G base station may include an eLTE base station capable of supporting, as well as a 5G NB, one or more functions of the 5G network. That is, the eLTE base station denotes a base station satisfying enhanced performance based on the LTE radio access technology as a radio access technology configured to satisfy any or all of requirements of the IMT-2020 described above. Accordingly, embodiments of the 5G base station according to the present disclosure and related description may be equally applicable to the eLTE base station.

Meanwhile, in the NSA 1 or NSA 2 structure, to configure dual connectivity, it may be necessary for the EPC or a master base station (e.g., an LTE base station) to identify capability information on a secondary base station (e.g., a 5G base station) and a UE.

For example, it may be necessary for the EPC or the master base station to identify at least one of the following information.

1) Secondary node type information: information indicates which radio access technology of the 5G, the LTE, or the eLTE the secondary node uses.

2) Information on a connection of the S1-U interface of the secondary node: information indicates whether the secondary node is connected to the SWG or not.

3) Bearer process capability information of the secondary node: information indicates whether a secondary cell group SCG bearer or an SCG split bearer (a bearer for supporting the secondary node bearer to be split and transmitted in a master node and a secondary node) can be processed.

4) Information on radio access support of the UE: information indicates whether the UE supports LTE-only radio access, whether the UE supports LTE radio access and 5G radio access simultaneously and whether the UE supports 5G-only radio access.

5) Network information supported by the UE: information indicates a network structure supported by the UE. For example, information indicates whether the UE supports the NSA structure, or whether the UE supports the NSA structure and the SA structure simultaneously, etc.

The EPC or the master base station may restrict or reject access of the UE using at least one of information as described above, if necessary.

Hereinafter, embodiments of the present disclosure are discussed based on the NSA1 network structure described above. However, the embodiments of the present disclosure are not limited thereto, and may be equally applicable to the NSA2 network structure.

Figure 3:
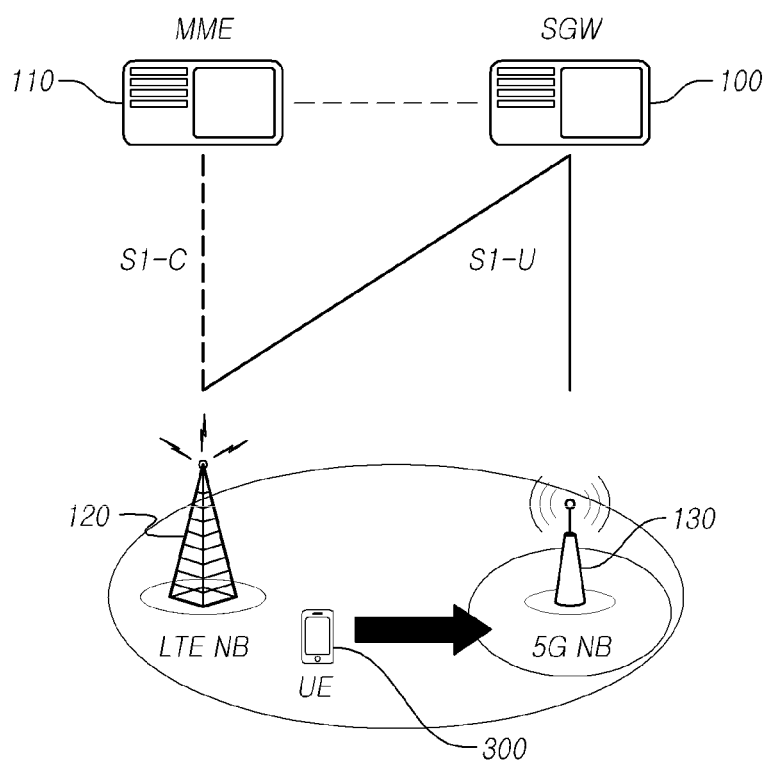
FIG. 3 is a view illustrating a 5G base station connection addition scenario in an NAS network structure according to embodiments of the present disclosure.
Figure 4:
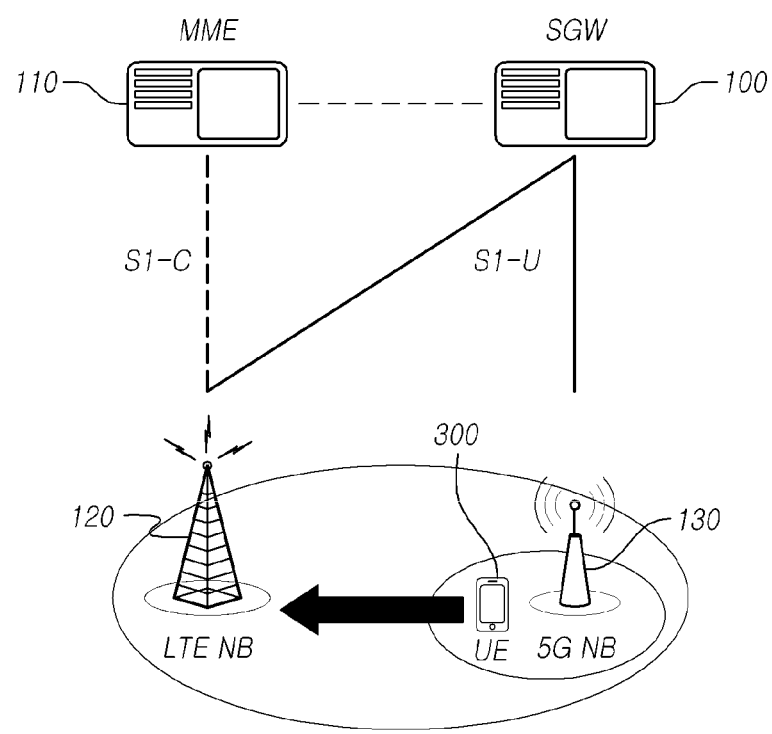
FIG. 4 is a view illustrating a 5G base station connection release scenario in the NAS network structure according to embodiments of the present disclosure.

FIG. 3 is a view illustrating a 5G base station connection addition scenario in the NAS network structure according to embodiments of the present disclosure. FIG. 4 is a view illustrating a 5G base station connection release scenario in the NAS network structure according to embodiments of the present disclosure.

Referring to FIGS. 3 and 4, in the NSA1 network structure, the UE 300 may enter within a coverage of the 5G base station 130 by its movement. In this case, the UE 300 may be configured with dual connectivity using the 5G base station 130 and increase data transmission/reception rate and data throughput.

Accordingly, in case of the deployment as in FIG. 3, the UE 300 may be configured with dual connectivity by the LTE base station 120 as a master base station and the 5G base station 130 as a secondary base station, while maintaining the connection with the LTE base station 120. To this end, it is required to provide an addition or reconfiguration procedure for the secondary base station.

On the contrary, while the UE 300 is configured with dual connectivity by the LTE base station 120 and operates, within the coverage of the 5G base station 130, the UE may move out of the coverage of the 5G base station 130 by its movement. In this case, the UE 300 is required to perform a procedure for releasing the 5G base station 130 which is a secondary base station configuring the dual connectivity.

Thus, in a network structure including the LTE base station 120 and the 5G base station 130, it is necessary for the UE to perform operation for configuring and releasing the dual connectivity by its movement. In particular, in case the dual connectivity is configured by the 5G base station 130 which is a secondary base station, it is required to provide a specific procedure related to the configuration and release of the dual connectivity over the Xx interface.

Hereinafter, embodiments of the present disclosure for satisfying such requirements will be described with reference to the accompanying drawings.

Figure 5:
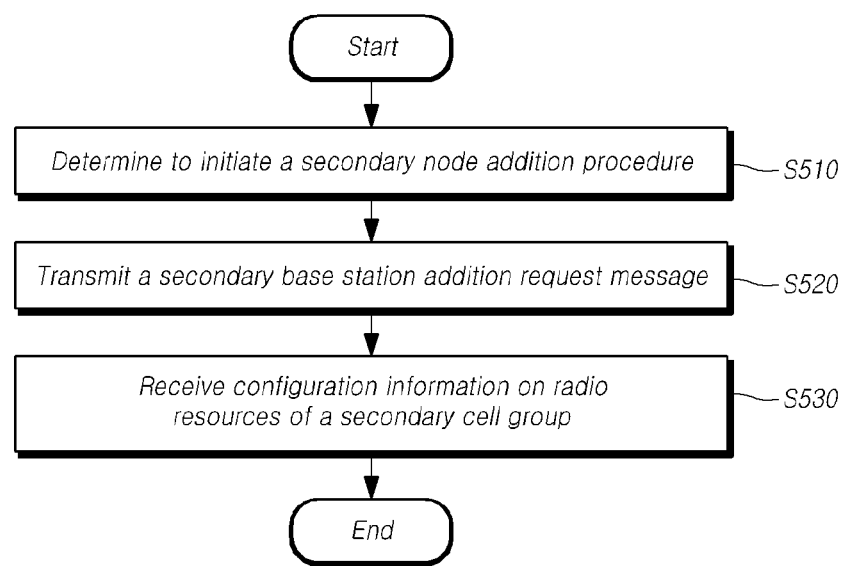
FIG. 5 is a flowchart illustrating operation of a master base station according to embodiments of the present disclosure.

FIG. 5 is a flowchart illustrating operation of a master base station according to embodiments of the present disclosure.

Referring to FIG. 5, the master base station may perform operations for determining to initiate a secondary node addition procedure to establish a UE context at a secondary node to provide radio resources of the secondary node to a UE at step S510.

For example, the master base station may receive results of channel quality measurement by the UE for an LTE base station and a 5G base station, and determine whether to add the radio resources of the secondary node to the UE based on the channel quality measurement results.

As needed, the master base station or the secondary base station may transmit capability information of the UE, the master base station and the secondary base station to an EPC entity (e.g., an MME), and then the EPC entity may determine whether dual connectivity can be configured for the UE using the master base station and the secondary base station based on the received information. As needed, the EPC entity may restrict or reject the access of the UE or the configuration of dual connectivity Meanwhile, the secondary node may be a secondary base station employing a different radio access technology from the master base station. For example, the master base station may be an LTE base station, and the secondary base station may be a 5G base station.

The master base station may determine to initiate the secondary node addition procedure to provide radio resources from the secondary node to the UE, based on at least one of the measurement information from the UE and a result of the determination of the EPC entity (e.g., an MME) as to whether to restrict the access of the UE or the configuration of dual connectivity. Through the secondary node addition procedure, the master base station may establish a UE context at the secondary node.

Meanwhile, the secondary base station may include one central unit and one or more distributed units and be connected to an LTE EPC through the NSA1 structure or the NSA2 structure described above.

The master base station may transmit, to the secondary node, a secondary base station addition request message for requesting to allocate radio resources for a specific E-UTRAN radio access bearer (E-RAB) at step S520. When the initiation of the secondary node addition procedure is determined, the master base station may add the secondary node to the UE and may transmit the secondary base station addition request message to the secondary node in order to configure dual connectivity.

For example, the dual connectivity may be configured for a specific radio bearer (E-RAB). To this end, the master base station may request to allocate radio resources for the specific E-RAB.

Meanwhile, the secondary base station addition request message may include at least one of UE capability information and radio resource configuration information of the master base station. Specifically, the UE capability information may include a RAT-Type information element including information on a radio access technology supported by the UE. In addition, the radio resource configuration information of the master base station includes configuration information on radio resources configured to the UE by the master base station.

The RAT-Type information element of the UE capability information may include at least one of whether the UE supports each radio access technology, whether the UE supports multi-connectivity that uses each radio access technology, and which function the UE supports for each radio access technology. Such information may be included in UE capability RAT container list information by being included in an individual container in the RAT-Type information element.

The master base station may perform operations for receiving secondary cell group radio resource configuration information for additionally allocating resources to the UE from the secondary node at step S530. For example, if the secondary node acknowledges the allocation of radio resources for the requested E-RAB, the master base station may configure dual connectivity to the UE and receive radio resource configuration information on an added secondary cell group.

For example, an RRM entity of the secondary cell node may acknowledge the allocation of radio resources for the requested E-RAB, and determine a primary secondary cell (PSCell) to be included in a secondary cell group and secondary cells except for the PSCell. When the cells are determined, the secondary node may include secondary cell group radio resource configuration information for providing radio resources of the cell(s) to the UE in an RRC configuration message, and then transmit to the master base station.

The master base station may receive the secondary cell group radio resource configuration information included in the RRC configuration message through a secondary base station addition request acknowledgment message.

Through such a procedure, the master base station may add a secondary base station employing a different radio access technology as a base station which configures dual connectivity for a UE.

Additionally, when the secondary base station addition request acknowledgment message is received, the master base station may instruct the UE to add the secondary node as a dual connectivity base station by transmitting an RRC connection reconfiguration message to the UE. When the UE is configured with dual connectivity using the secondary node and reports the dual connectivity configuration to the master base station, the master base station transmits a message for indicating that a secondary base station reconfiguration procedure has been completed to the secondary node.

Thereafter, the UE may perform a random access procedure with the secondary node using the PSCell of the secondary cell group and configure the connection to the secondary node.

Figure 6:
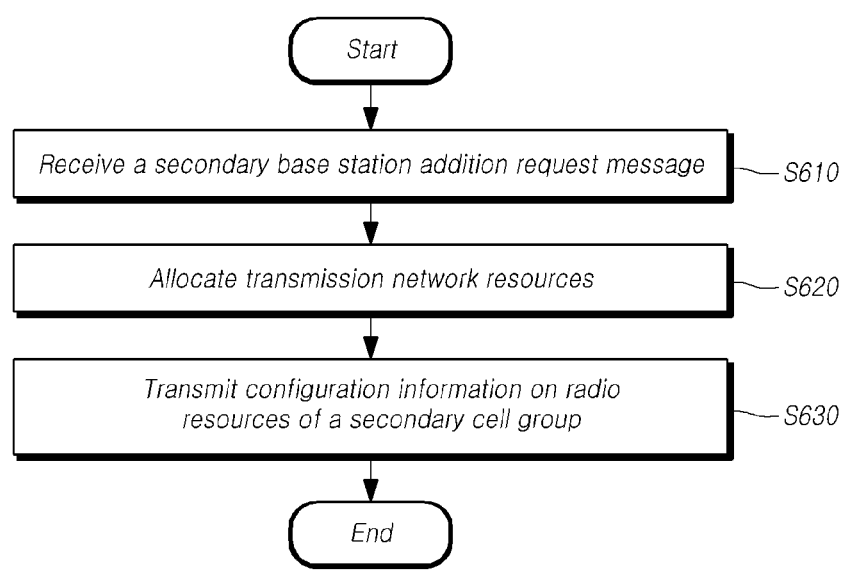
FIG. 6 is a flowchart illustrating operation of a secondary base station according to embodiments of the present disclosure.

FIG. 6 is a flowchart illustrating operation of a secondary base station according to embodiments of the present disclosure.

Referring to FIG. 6, the secondary base station may perform operations for receiving, from a master node, a secondary base station addition request message for requesting to allocate radio resources for a specific E-UTRAN radio access bearer (E-RAB) of a UE at step S610. When the allocation of the radio resources for the specific E-RAB is determined by the master node, and when the initiation of a secondary node addition procedure for configuring a UE context at the secondary node is determined, the secondary base station may receive the secondary base station addition request message from the master node.

The master node and the secondary base station may denote master base stations employing different radio access technologies from each other and denotes a base station acting as a reference of a handover by configuring an RRC connection to a UE. For example, the master base station may be an LTE base station, and the secondary base station may be a 5G base station. The secondary base station and the master base station may be configured with dual connectivity and thus provide radio resources to a UE.

Meanwhile, the secondary base station may include one central unit and one or more distributed units and be connected to an LTE EPC through the NSA1 structure or the NSA2 structure described above.

Meanwhile, the secondary base station addition request message may include at least one of UE capability information and radio resource configuration information of the master node. Specifically, the UE capability information may include a RAT-Type information element including information on a radio access technology supported by the UE. In addition, the radio resource configuration information of the master base station includes configuration information on radio resources configured to the UE by the master node.

The RAT-Type information element of the UE capability information may include information indicating at least one of i) whether the UE supports each radio access technology, ii) whether the UE supports multi-connectivity that uses each radio access technology, and iii) which function the UE supports for each radio access technology. Such information may be included in UE capability RAT container list information by being included in an individual container in the RAT-Type information element.

An RRM entity of the secondary base station may acknowledge the allocation of radio resources for a specific E-RAB and perform operations for allocating transmission network resources depending on an E-RAB option at step S620. For example, the RRM entity of the secondary base station may acknowledge the allocation of radio resources for the requested E-RAB and determine a primary secondary cell (PSCell) to be included in a secondary cell group and secondary cells except for the PSCell.

In addition, the RRM entity may allocate a transmission network resource based on option information of the requested E-RAB. For example, the E-RAB option information may include at least one of a QoS flow, whether a split bearer is configured or not, characteristic information of the E-RAB and type information.

The RRM entity may determine whether to allocate a transmission network resource, taking into account whether the secondary base station can provide radio resources, whether in case the corresponding bearer is a split bearer, the secondary base station can process this, etc. by using the E-RAB option information.

The secondary base station may perform operations for transmitting secondary cell group radio resource configuration information for additionally allocating resources to the UE to the master node at step S630.

When the cells to be provided for the corresponding E-RAB are determined, the secondary base station may include the secondary cell group radio resource configuration information for providing radio resources for the cell(s) to the UE in an RRC configuration message, and then transmit to the master node. The secondary base station may transmit the secondary cell group radio resource configuration information included in the RRC configuration message through a secondary base station addition request acknowledgment message.

Through such a procedure, the secondary base station may determine radio resources for configuring dual connectivity for the UE and then indicate the determined radio resource(s) to the UE.

Thereafter, the master node may transmit the secondary cell group radio resource configuration information to the UE. When the UE is configured with dual connectivity using the radio resource configuration information of the secondary cell group, the master node may transmit a message for the completion of the configuration to the secondary base station.

Thereafter, the secondary base station may perform a random access procedure through the UE and PSCell, and then may be configured with the dual connectivity.

Meanwhile, the secondary base station is a 5G base station and may include a central unit and a distributed unit, as described above.

Figure 7:
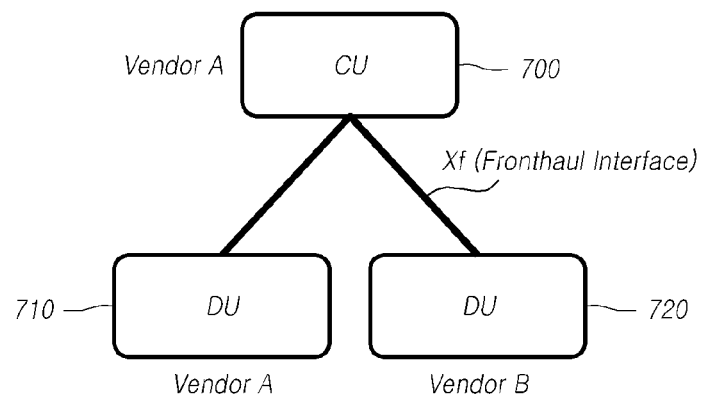
FIG. 7 is a view illustrating a structure of a secondary base station according to embodiments of the present disclosure.

FIG. 7 is a view illustrating a structure of a secondary base station according to embodiments of the present disclosure.

Referring to FIG. 7, a 5G base station using a 5G radio access network (RAN) may include a central unit 700 which is normally installed in a centralization station and a distributed unit, 710, 720) which is normally installed in a cell site. A base station may include one CU 700 and one or more DU 710, 720 connected to the CU 700.

For example, the CU 700 may be connected to a DU 710 manufactured by a vendor A and also connected to a DU 720 manufactured by a vendor B. The CU 700 and the DUs 710 and 720 may be manufactured or installed by an identical vendor or different vendors. In this case, the CU 700 and the DU 710 may be deployed by an identical vendor, or the CU 700 and the DU 710 may be deployed by different vendors.

The CU 700 and the DUs 710 and 720 may be connected to each other through a fronthaul interface. Hereinafter, the fronthaul interface for connecting between the CU 700 and the DUs 710 and 720 is discussed by being expressed as Xf. As needed, the fronthaul may be described as Midhaul.

Meanwhile, the DUs 710 and 720 may include or be separated from, a radio frequency (RF) function or an antenna function. In case the DUs are separated from the radio frequency (RF) function or the antenna function, a base station may be designed an RF/antenna (not shown) to have a three-step separation structure.

Figure 8:
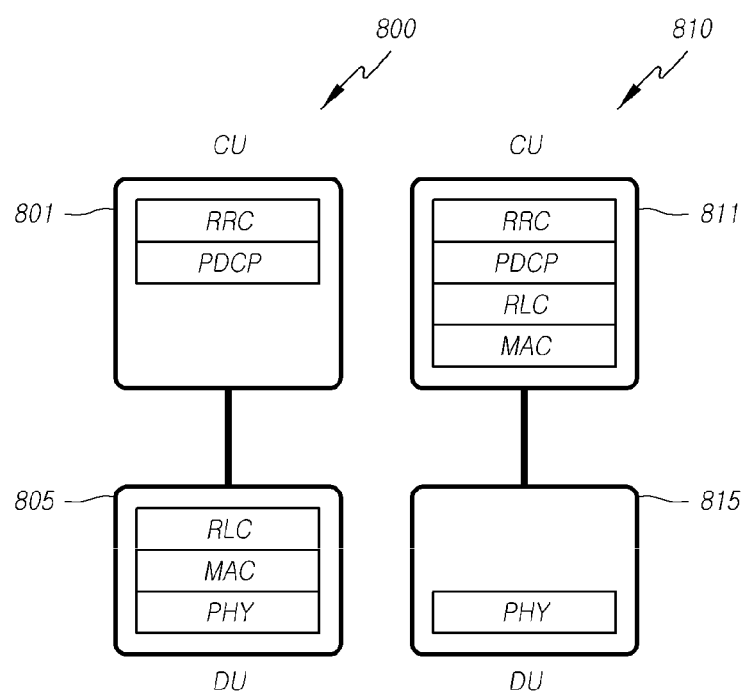
FIG. 8 is a view illustrating a structure of a secondary base station including a central unit and a distributed unit according to embodiments of the present disclosure.

A base station according to embodiments is an independent network function (NF) which is a physical (PHY) function, a media access control (MAC) function, a radio link control (RLC) function, a packet data convergency protocol (PDCP) function, or a radio resource control (RRC) function, as a baseband function, and may be implemented in a virtualization manner. In addition, each of one or more higher protocol functions and one or more lower protocol functions of the base station may be configured in the CU or the DU as needed, as shown in FIG. 8. As another example, the independent network functions may not be virtualized and be implemented in a fixed manner.

FIG. 8 is a view illustrating a structure of a secondary base station including a central unit and a distributed unit according to embodiments of the present disclosure.

The central unit and the distributed unit, which are included in the secondary base station (5G base station), may be designed in various types. Referring to FIG. 8, a type 1 base station 800 may include the central unit 801 having RRC and PDCP network functions, and the distributed unit 805 having RLC, MAC, and PHY network functions. For another example, the secondary base station as in a type 2 base station 810 may include the central unit 811 having RRC, PDCP, RLC, and MAC network functions, and the distributed unit 815 having only a PHY network function. In addition, as needed, the central units 801 and 811 may have one or more functions for allowing non real-time processing of the RLC or the MAC, and the distributed units 805 and 815 may have one or more functions for real-time processing.

Thus, the central units 801 and 811 may have at least one of RRC, PDCP, RLC and MAC network functions, and distributed units 805 and 815 may have at least one of RLC, MAC and PHY network functions. As another example, in a device in which the RF and the antenna are integrated, the RF may be included in the distributed units 805 and 815. Accordingly, a base station may be configured to have various separation structures, in addition to the type 1 base station 800 and the type 2 base station 810. For example, since each of the RLC layer and the MAC layer have a packed processing function similar to each other, such as, packed concatenation (or multiplexing, assembling, etc.), packed segmentation (or de-multiplexing, etc.), packet reordering and packed retransmission, etc., they may be integrated into a single layer or one or more similar functions may be concatenated for high-performance packet processing. For another example, as needed, a specific network function may be removed or not be used.

Such a base station may be configured in various separation structures as needed.

For example, since the type 1 base station 800 is easy to perform interworking between 5G and LTE/WiFi base station devices through the PDCP and requires small capacity of fronthole data transmission, the type 1 base station 800 may be suitable for mmWave base stations for transmitting broadband transmission. On the other hand, the type 2 base station 810 enables transmission delay to be short and radio resource scheduling to be performed rapidly, but requires large capacity fronthole data transmission. Therefore, the type 2 base station 810 may be suitable for base stations using frequencies below a frequency band of 6 GHz.

Meanwhile, the DUs 805 and 815 may further include a radio resource management (RRM) function differently from the CUs 801 and 811, for supporting mobility etc. For another example, an RRM entity may be configured in the CUs 801 and 811. For another example, a network function (e.g., RRC) corresponding to a RAN control plane (CP) may be deployed in both the CUs 801 and 811 and the DUs 805 and 815.

Meanwhile, the S1-U interface described above may connect between an SGW and each of the CUs 801 and 811. In particular, in the NSA structure, a protocol layer function which processes mapping between a QoS flow located in or over the PDCP of the CUs 801 and 811 and a bearer may be deactivated (or non-processing transmission). Herein, a protocol layer which processes mapping between the QoS flow and the bearer is referred to as a packet data association protocol (PDAP), but the embodiments of the present disclosure are not limited thereto. It is noted that in an EPC and a UE, the PDAP layer may be dynamically activated in case the QoS flow function is additionally supported in bearer processing.

As described above, a secondary base station is a 5G base station and may include a central unit and a distributed unit separated from the central unit.

As described above, in an EPC-based NSA network structure, a UE connected to an LTE base station may additionally connected to a 5G base station as it moves.

In case a 5G base station is added, the added 5G base station may perform its function using a UE/base station capability information indication (UE/NB Capability Info Indication) procedure through the S1 interface and a secondary base station addition/reconfiguration (SNB Addition/Reconfiguration) procedure through the Xx interface. The corresponding procedure may be similarly applicable to the NSA2 network structure.

The UE/NB Capability Info Indication procedure of a S1AP is a message used for enabling a base station to transmit information of a UE and the base station to an MME, and may be used by modifying or utilizing the typical S1 message. When 5G base station connection is available based on the received information of the UE and the base station, the MME transmits, to the base station, a UE/base station capability information identification acknowledgment (UE/NB Capability Info Indication Acknowledge) message and acknowledges that dual connectivity connection is allowed. When the 5G base station connection is not available, the MME transmits, to the base station, a UE/base station capability information indication failure (UE/NB Capability Info Indication Failure) message including a failure cause, and notifies that the dual connectivity connection is not allowed.

Hereinafter, including the above described procedure, an entire procedure is discussed for adding a secondary base station in a UE and establishing a dual connectivity configuration with reference to the accompanying drawings. Each message of a procedure described below is not limited to its term, and one or more operations may be omitted or reordered.

Figure 9:
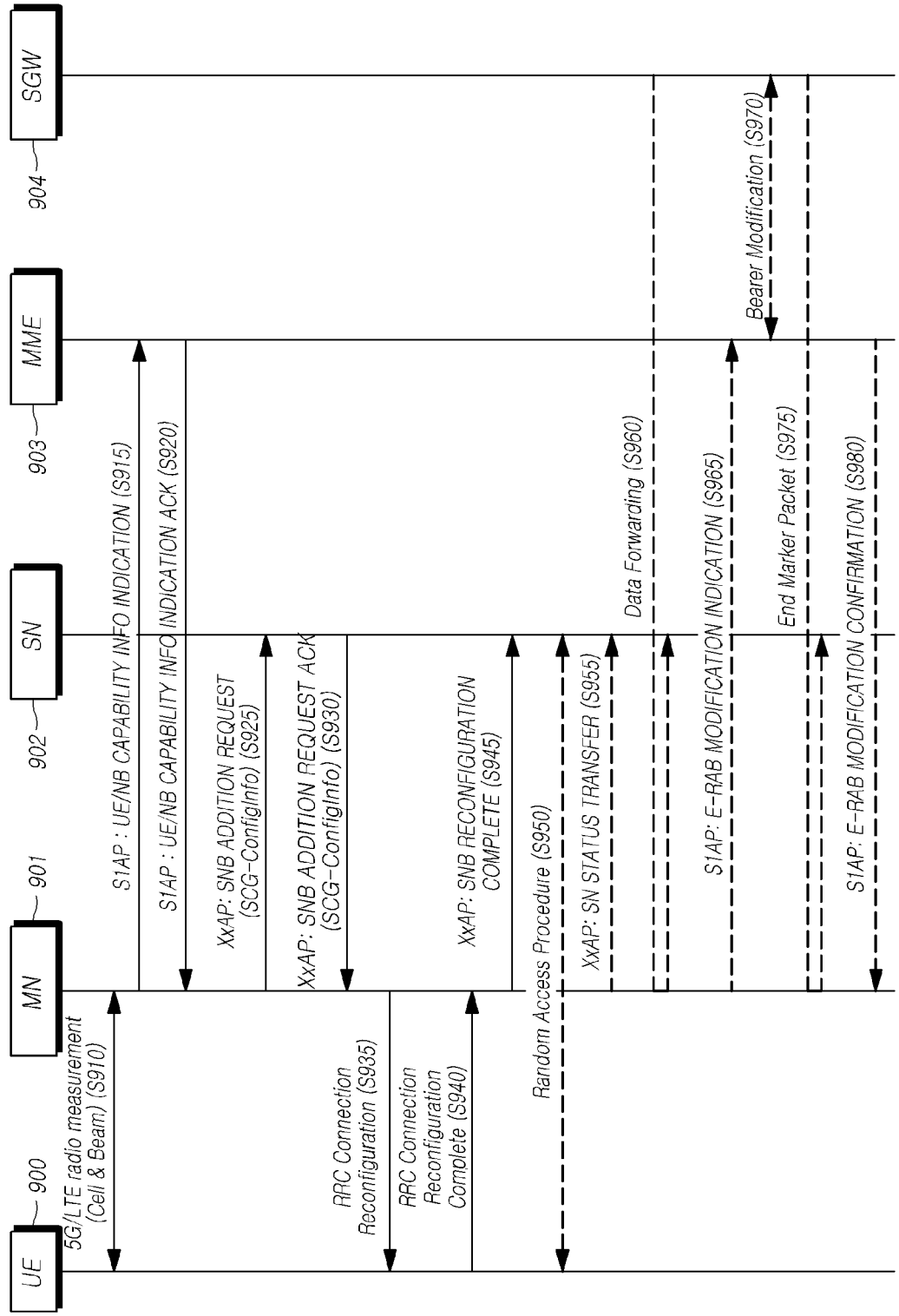
FIG. 9 is a signal flow view for describing a procedure for configuring dual connectivity using a secondary base station according to embodiments of the present disclosure.

FIG. 9 is a signal flow view for describing a procedure for configuring dual connectivity using a secondary base station according to embodiments of the present disclosure.

Referring to FIG. 9, for description of embodiments, it may be considered that an master node (MN) 901 is an LTE base station, and a secondary node (SN) 902 is a 5G base station. In addition, it may be considered that each message is transmitted/received using a protocol such as a S1AP or a XxAP. An NB denotes a base station, as a NodeB. Accordingly, the NB is described as a meaning including both a master base station (MNB) and a secondary base station (SNB). As needed, a master base station 901 is described/illustrated as the MNB, and a secondary base station 902 is described/illustrated as the SNB. It should be considered that the MNB includes an MeNB, and the SNB includes a SgNB as a 5G base station.

While a 5G base station is connected to the master base station 901, specific operations are performed for additionally connecting the 5G base station as the secondary base station 902 as follows.

A UE 900 measures the quality of 5G and LTE radio channels and reports the measurement to the MN 901 at step S910. The corresponding report may include information on cell quality and beam quality.

The MN 901 which is the LTE base station transmits the information of the UE 900 and base stations 901 and 902 to an MME 903 at step S915. That is, the MN 901 transmits the UE/NB Capability Info Indication message to the MME 903.

The MME 903 determines whether the 5G base station connection is available based on the received information of the UE 900 and the base stations 901 and 902. When necessary, the EPC may restrict or reject access of the UE 900 or dual connectivity support.

The MME 903 transmits, to the MN 901, a UE/base station capability information identification acknowledgment (UE/NB Capability Info Indication Acknowledge) message and allows the dual connectivity to be configured at step S920. When the connection of the 5G base station 920 is not allowable, the MME 903 transmits, to the MN 901, a UE/base station capability information indication failure (UE/NB Capability Info Indication Failure) message including a failure cause, and notifies that the dual connectivity connection is not supported.

The MN 901 requests to allocate one or more radio resources for a specific E-RAB to the SN 902 at step S925. For example, the MN 901 may transmit a secondary base station addition request message to the SN 902. The secondary base station addition request message may include at least one of SCG-ConfigInfo, UE capability information and MCG-ConfigInfo. For example, the UE capability information may include information on a radio access technology supported by the UE 900, and/or may include a RAT-Type information element including information on the radio access technology supported by the UE 900. The RAT-Type information element of the UE capability information may include information indicating at least one of i) whether the UE supports each radio access technology, ii) whether the UE supports multi-connectivity that uses each radio access technology, and iii) which function the UE supports for each radio access technology. Such information may be included in UE capability RAT container list information by being included in an individual container in the RAT-Type information element.

When the requested radio resource is available, the SN 902 allocates the radio resource and transmits a secondary base station addition request acknowledgment message including SCG-Config information to the MN 901 at step S930. For example, when the allocation of the requested radio resource for the E-RAB is acknowledged, the SN 902 may transmit a secondary base station addition request acknowledgment message including radio resource configuration information on a secondary cell group added for configuring dual connectivity to the UE 900. The secondary base station addition request acknowledgment message may include an RRC configuration message including information for configuring radio resources of a primary secondary cell (PSCell) to be included in the secondary cell group and a secondary cell except for the PSCell to the UE.

When the SN 902 acknowledges the corresponding configuration, the MN 901 transmits an RRC connection reconfiguration message to the UE 900 at step S935. Through this, the UE 900 may be configured with the radio resource configuration of the secondary cell group, and then prepare dual connectivity.

After the UE 900 has applied the radio resource configuration of the secondary cell group, the UE 900 transmits an RRC connection reconfiguration completion message to the MN 901 at step S940.

The MN 901 transmits, to the SN 902, a secondary base station reconfiguration completion message for indicating that the secondary cell group radio resource configuration of the UE has been completed at step S945.

The UE 900 achieves synchronization with the PSCell and performs a random access procedure with the SN 902 at step S950.

The MN 901 performs SN status transfer of a transmission packet at step S955. When data is received from an SGW 904, the MN 901 performs a data forwarding procedure for forwarding this to the SN 902 at step S960.

Thereafter, in order to update a data path to the MME 903 of the EPC, the MN 901 transmits E-RAB modification indication message at step S965, and the MME 903 performs a bearer modification procedure with the SGW 904 at step S970.

The SGW 904 transmits an end marker packet to the MN 901, and the MN 901 forwards this to the SN 902 at step S975. The MME 980 transfers a modification confirmation message for the E-RAB modification to the MN 901 and completes the data path update procedure.

As described above, according to embodiment of the present disclosure, in the 5G NSA network structure based on the LTE EPC, a procedure is provided for supporting dual connectivity based mobility occurred when a UE moves between a 5G base station and an LTE base station. Therefore it is possible to provide a service consecutively and to reduce cost significantly for deploying and operating a 5G radio network.

Hereinafter, an exemplary master base station and an exemplary secondary base station are discussed for performing all or some of operations of the master base station and the secondary base station described with reference to FIGS. 1 to 9. Each operation may be performed by a control module, a transmission module and a reception module configured in a base station, or one or more operations may be performed by one electronic module or a plurality of electronic modules.

Figure 10:
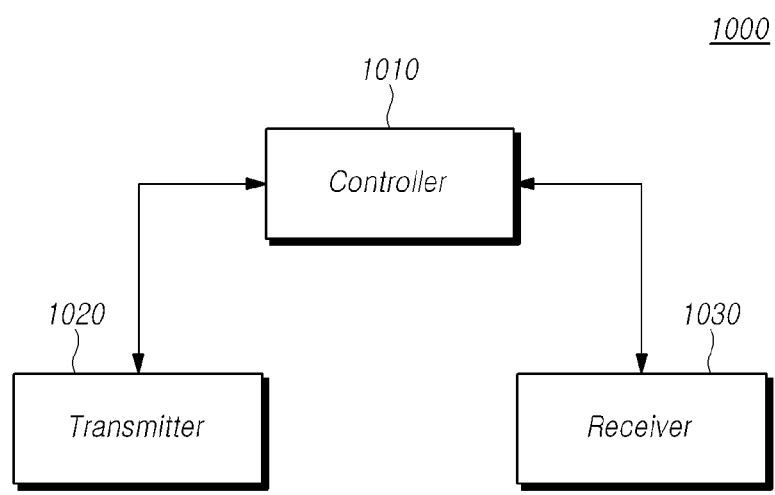
FIG. 10 is a block diagram illustrating a master base station according to embodiments of the present disclosure.

FIG. 10 is a block diagram illustrating a master base station configuration according to embodiments of the present disclosure.

Referring to FIG. 10, a master base station 1000 may include: a controller 1010 determining to initiate a secondary node addition procedure for establishing a UE context at a secondary node in order to provide one or more radio resources from the secondary node to the UE, a transmitter 1020 transmitting, to the secondary node, a secondary base station addition request message for requesting to allocate the radio resources for a specific E-UTRAN radio access bearer (E-RAB), and a receiver 1030 receiving, from the secondary node, secondary cell group radio resource configuration information for additionally providing one or more secondary cell group radio resources to the UE.

For example, the receiver 1030 may receive results of channel quality measurement by the UE for an LTE base station and a 5G base station, and the controller 1010 may determine whether to add the radio resources of the secondary node to the UE based on the channel quality measurement results.

As needed, the transmitter 1020 may transmit capability information of the UE, the master base station and the secondary base station to an EPC entity (e.g., an MME), and then the EPC entity may determine whether the UE may be configured with dual connectivity using the master base station and the secondary base station based on the received information. As needed, the EPC entity may restrict or reject the access of the UE or the configuration of dual connectivity.

The controller 1010 may determine to initiate the secondary node addition procedure in order to provide radio resources from the secondary node to the UE, based on at least one of the measurement information from the UE and a result of the determination of the EPC entity (e.g., an MME) as to whether to restrict the access of the UE or the configuration of dual connectivity.

When the initiation of the secondary node addition procedure is determined, the transmitter 1020 may add the secondary node to the UE and may transmit the secondary base station addition request message to the secondary node in order to configure dual connectivity. For example, the dual connectivity may be configured for a specific radio bearer (E-RAB). To this end, the transmitter 1020 may request to allocate radio resources for the specific E-RAB. The secondary base station addition request message may include at least one of UE capability information and radio resource configuration information of the master base station. Specifically, the UE capability information may include a RAT-Type information element including information on a radio access technology supported by the UE. In addition, the radio resource configuration information of the master base station includes configuration information on radio resources configured on the UE by the master base station. The RAT-Type information element of the UE capability information may include information indicating at least one of i) whether the UE supports each radio access technology, ii) whether the UE supports multi-connectivity that uses each radio access technology, and iii) which function the UE supports for each radio access technology. Such information may be included in UE capability RAT container list information by being included in an individual container in the RAT-Type information element.

In addition, if the secondary node acknowledges the allocation of radio resources for the requested E-RAB, the receiver 1030 may configure dual connectivity to the UE and receive radio resource configuration information on an added secondary cell group. For example, when the cells of the secondary node(s) are determined, the receiver 1030 may receive an RRC configuration message including secondary cell group radio resource configuration information for providing radio resources for the cell(s) to the UE. The receiver 1030 may receive the secondary cell group radio resource configuration information included in the RRC configuration message through a secondary base station addition request acknowledgment message.

Additionally, when the secondary base station addition request acknowledgment message is received, the transmitter 1020 may instruct the UE to add the secondary node as a dual connectivity base station by transmitting an RRC connection reconfiguration message to the UE. In addition, when the UE is configured with dual connectivity using the secondary node, the receiver 1030 may receive a completion message for the configuration of the dual connectivity. Thereafter, the transmitter 1020 transmits, to the secondary node, a message for indicating that a secondary base station reconfiguration procedure has been completed.

In addition, the controller 1010 may control overall operations of the master base station 1000 for configuring multi-connectivity for the UE using a plurality of base stations employing different radio access technologies from one another according to embodiments described above.

In addition, the transmitter 1020 and the receiver 1030 are configured to transmit or receive signals, messages, data required to perform embodiments described above to or from the UE, the EPC entity, and/or the secondary base station.

Figure 11:
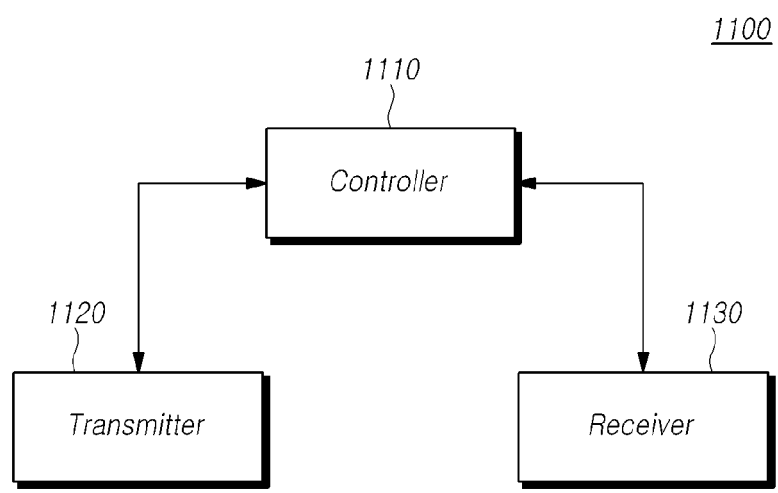
FIG. 11 is a block diagram illustrating a secondary base station according to embodiments of the present disclosure.

FIG. 11 is a block diagram illustrating a secondary base station configure according to embodiments of the present disclosure.

Referring to FIG. 11, the secondary base station 1100 includes: a receiver 1130 receiving, from a master node, a secondary base station addition request message for requesting to allocate one or more radio resources for a specific E-UTRAN radio access bearer (E-RAB) of the UE, a controller 1110 acknowledging radio resource allocation for the specific E-RAB by a RRM entity and allocating one or more transmission network resources depending on an E-RAB option, and a transmitter 1120 transmitting, to the master node, a secondary cell group radio resource configuration information for additionally providing one or more secondary cell group radio resources to the UE.

When the master node determines the allocation of the radio resources for the specific E-RAB, and when the master node determines the initiation of a secondary node addition procedure for configuring a UE context at the secondary node, the receiver 1130 may receive the secondary base station addition request message from the master node. For example, the secondary base station addition request message may include at least one of UE capability information and radio resource configuration information of the master node. Specifically, the UE capability information may include a RAT-Type information element including information on a radio access technology supported by the UE. In addition, the radio resource configuration information of the master base station includes configuration information on radio resources configured to the UE by the master node. The RAT-Type information element of the UE capability information may include information indicating at least one of i) whether the UE supports each radio access technology, ii) whether the UE supports multi-connectivity that uses each radio access technology, and iii) which function the UE supports for each radio access technology. Such information may be included in UE capability RAT container list information by being included in an individual container in the RAT-Type information element.

In addition, the controller 1110 may acknowledge the allocation of radio resources for the requested E-RAB, and determine a primary secondary cell (PSCell) to be included in a secondary cell group and secondary cells except for the PSCell. In addition, the controller 1110 may allocate a transmission network resource based on option information of the requested E-RAB. For example, the E-RAB option information may include at least one of a QoS flow, whether a split bearer is configured or not, characteristic information of the E-RAB and type information. The controller 1110 may determine whether to allocate a transmission network resource, taking into account whether the secondary base station can provide radio resources, whether in case the corresponding bearer is a split bearer, the secondary base station can process this, etc. by using the E-RAB option information.

When the cells to be provided for the corresponding E-RAB are determined, the transmitter 1120 may include the secondary cell group radio resource configuration information for providing radio resources for the cell(s) to the UE in an RRC configuration message, and then transmit to the master node. The transmitter 1120 may transmit the secondary cell group radio resource configuration information included in the RRC configuration message through a secondary base station addition request acknowledgment message.

In addition, the controller 1110 may control overall operations of the secondary base station 1100 for configuring multi-connectivity for the UE using a plurality of base stations employing different radio access technologies from one another according to embodiments described above.

In addition, the transmitter 1120 and the receiver 1130 are configured to transmit or receive signals, messages, data required to perform embodiments described above to or from the UE, the EPC entity, and/or the master base station.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of a master base station for performing a procedure of controlling the mobility of a user equipment (UE), the method comprising:
   determining to initiate a secondary node addition procedure for establishing a UE context at a secondary node in order to provide one or more radio resources from the secondary node to the UE;
   transmitting, to the secondary node, a secondary base station addition request message for requesting to allocate the one or more radio resources for a specific E-UTRAN radio access bearer (E-RAB); and
   receiving, from the secondary node, secondary cell group radio resource configuration information for additionally providing the one or more radio resources to the UE,
   wherein the secondary base station addition request message includes Radio Access Technology (RAT)-Type information element including information on a radio access technology supported by the UE, and
   wherein the RAT-Type information element includes information on whether the UE supports multi-connectivity that uses each radio access technology.

2. The method according to claim 1, wherein the secondary node is a secondary base station configured to employ a radio access technology different from the master base station, and
   wherein the master base station and the secondary base station configure dual connectivity for the UE.

3. The method according to claim 2, wherein the secondary base station includes one central unit and one or more distributed units connected to the central unit, and is configured to use a core network of the master base station.

4. The method according to claim 1, wherein, when the allocation of the one or more radio resources for the specific E-RAB by an RRM entity of the secondary node is acknowledged, the secondary cell group radio resource configuration information is included an RRC configuration message including radio resource configuration information for a primary secondary cell (PSCell) included in a secondary cell group.

5. A method of a secondary base station for performing a procedure of controlling the mobility of a user equipment (UE), the method comprising:
   receiving, from a master node, a secondary base station addition request message for requesting to allocate one or more radio resources for a specific E-UTRAN radio access bearer (E-RAB) of the UE;
   acknowledging of an RRM entity to allocate the one or more radio resources for the specific E-RAB, and allocating one or more transmission network resources according to an option of the E-RAB; and
   transmitting, to the master node, secondary cell group radio resource configuration information for additionally providing the one or more radio resources to the UE,
   wherein the secondary base station addition request message includes Radio Access Technology (RAT)-Type information element including information on a radio access technology supported by the UE, and
   wherein the RAT-Type information element includes information on whether the UE supports multi-connectivity that uses each radio access technology.

6. The method according to claim 5, wherein the master node is a master base station configured to employ a radio access technology different from the secondary base station, and
   wherein the secondary base station and the master base station configure dual connectivity for the UE.

7. The method according to claim 6, wherein the secondary base station includes one central unit and one or more distributed units connected to the central unit, and is configured to use a core network of the master base station.

8. The method according to claim 5, wherein the secondary cell group radio resource configuration information is included an RRC configuration message including radio resource configuration information for a primary secondary cell (PSCell) included in a secondary cell group.

9. A master base station for performing a procedure of controlling the mobility of a user equipment (UE), the master base station comprising:
   a controller configured to determine to initiate a secondary node addition procedure for establishing a UE context at a secondary node to provide one or more radio resources from the secondary node to the UE;
   a transmitter configured to transmit, to the secondary node, a secondary base station addition request message for requesting to allocate the one or more radio resources for a specific E-UTRAN radio access bearer (E-RAB); and
   a receiver configured to receive, from the secondary node, secondary cell group radio resource configuration information for additionally providing the one or more radio resources to the UE,
   wherein the secondary base station addition request message includes Radio Access Technology (RAT)-Type information element including information on a radio access technology supported by the UE, and
   wherein the RAT-Type information element includes information on whether the UE supports multi-connectivity that uses each radio access technology.

10. The master base station according to claim 9, wherein the secondary node is a secondary base station configured to employ a radio access technology different from the master base station, and wherein the master base station and the secondary base station configure dual connectivity for the UE.

11. The master base station according to claim 10, wherein the secondary base station includes one central unit and one or more distributed units connected to the central unit, and is configured to use a core network of the master base station.

12. The master base station according to claim 9, wherein, when the allocation of the one or more radio resources for the specific E-RAB by an RRM entity of the secondary node is acknowledged, the secondary cell group radio resource configuration information is included an RRC configuration message including radio resource configuration information for a primary secondary cell (PSCell) included in a secondary cell group.

* * * * *